United States Patent
Ibata et al.

[11] Patent Number: 6,140,721
[45] Date of Patent: Oct. 31, 2000

[54] SLENDER-TYPE CYLINDRICAL CORELESS MOTOR AND BATTERY DRIVEN EQUIPMENT USING THE SAME

[75] Inventors: Eiichi Ibata; Toshiaki Tsuzaki, both of Yonago, Japan

[73] Assignee: Matsushita Electric Industrial Co., Ltd., Japan

[21] Appl. No.: 09/362,751

[22] Filed: Jul. 29, 1999

[30] Foreign Application Priority Data

Jul. 31, 1998 [JP] Japan .................................. 10-217272

[51] Int. Cl.⁷ ...................................................... H02K 7/00
[52] U.S. Cl. ................................. 310/67 R; 310/40 MM; 310/261; 29/598
[58] Field of Search .......................... 310/67 R, 40 MM, 310/154, 237, 261; 29/598, 605

[56] References Cited

U.S. PATENT DOCUMENTS

| | | | |
|---|---|---|---|
| 3,514,654 | 5/1970 | Moresi | 310/266 |
| 4,200,971 | 5/1980 | Shimizu et al. | 29/598 |
| 4,286,375 | 9/1981 | Nakamura et al. | 29/597 |
| 4,327,304 | 4/1982 | Aoki | 310/266 |
| 4,412,146 | 10/1983 | Futterer et al. | 310/266 |
| 5,374,867 | 12/1994 | Takehara | 310/198 |
| 5,621,260 | 4/1997 | Fukuoka et al. | 310/154 |
| 5,780,947 | 7/1998 | Fukuoka et al. | 310/80 |
| 5,834,870 | 11/1998 | Tokushima et al. | 310/90 |
| 5,889,349 | 3/1999 | Yasuda | 310/261 |

FOREIGN PATENT DOCUMENTS

| | | |
|---|---|---|
| 60-017865 | 1/1985 | Japan . |
| 6-335195A | 12/1994 | Japan . |
| 9-9554 | 1/1997 | Japan . |
| 10-83622 | 3/1998 | Japan . |

Primary Examiner—Nicholas Ponomarenko
Assistant Examiner—Joseph Waks
Attorney, Agent, or Firm—Parkhurst & Wendel, L.L.P.

[57] ABSTRACT

A slender-type cylindrical coreless motor for use in battery driven equipment in which power-consumption is low, high reliability is achieved, miniaturization and long-term battery driving of the equipment are realized. The slender-type cylindrical coreless motor includes: a pipe (2) with one end fixed to a frame (1); a cylindrical magnet (3) disposed around the outer surface of the pipe (2); and an inner bearing (7) for holding a fixed portion of a shaft (5) to a rotor assembly body (4). A second end portion of the pipe (2) has a length that does not permit protrusion thereof from an end surface (3b) of the magnet (3), and the inner bearing (7) is located at the end surface (3b) of the magnet (3) concentrically with the outer diameter of the magnet. Portions of the inner bearing (7) and the end surface facing each other are joined with solder material, and portions of the pipe (2) and the magnet (3) facing each other are joined with solder material.

8 Claims, 5 Drawing Sheets

SLENDER-TYPE CYLINDRICAL CORELESS MOTOR AND BATTERY DRIVEN EQUIPMENT USING THE SAME

FIELD OF THE INVENTION

This invention relates to a slender cylindrical coreless motor mainly to be used in a battery driving equipment.

BACKGROUND OF THE INVENTION

In recent years, in a battery driving equipment, in particular, in a portable information-processing equipment such as a disk player, a cellular phone and the like, miniaturization of equipment and long-term battery driving are being strongly demanded. And, one of key points therefor is power-consumption lowering technologies. With low power consumption, long-term driving and weight lightening of a battery can be attained at the same time. Therefore, it is strongly demanded that a motor to be used in the equipment is designed to contribute to such power-consumption lowering.

The present applicant has disclosed in Japanese Patent Application Laid-Open No. 9-9554 an example of a slender cylindrical coreless motor (hereinafter, referred to as motor) directed to use in portable equipments. FIG. 3 shows the configuration thereof. As shown in the drawing, this motor is configured by comprising a frame 51 in shape of a slender cylinder, a magnet 53 inside the frame 51 and having a cylindrical shape with its end portion fixed to the aforementioned frame, a rotor assembly body 54 having a cylindrical coil encircling the magnet 53, a shaft 55 having an end fixed at the rotor assembly body 54, an outer bearing 56 which is disposed at an end portion of the frame 51 and bears the outer protruding part of the shaft 55, an inner bearing 57 which bears a part of the shaft 55 fixed to the rotor assembly body 54, a commutator 58 supplying electricity to the rotor assembly body 54, a brush 59, and a load dispatching terminal 60. And, a magnetic circuit is formed by the magnetized magnet 53 and the frame 51 encircling the magnetized magnet 53. On the other hand, load dispatching is implemented from the dispatching terminal 60 through the brush commutator to the rotor assembly body 54 which is then magnetized, driven and rotated, and outputting is implemented to the outside of the motor by the shaft 55. A configuration where a shaft penetrates through the center of a cylindrical magnet has been conventionally known. The above-described motor is suitable to realize a motor with a small diameter because the shaft 55, the outer bearing 56, the inner bearing 57 in which an inner bearing metal 63 is housed in a case 62, and the inner substance magnet 53 are disposed in different positions toward the axis so as not to interrupt with each other.

However, from the view point of furthering the power-consumption lowering, in the case where a large side pressure load is imposed on the output axis, with such a structure as in this example that the spacious distance between both bearings could not be easily taken, the problem that pivot loss got greater which obstructed power-consumption lowering came into existence.

On the other hand, a proposal trying to realize a small-diameter motor being left with a cylindrical magnet is found in Japanese Patent Laid-Open No. 10-83622 specification. FIG. 5 shows the structure thereof. This motor comprises a pipe 72 inside a frame 71 with its end portion fixed to the aforementioned frame 71, a cylindrical magnet 73 having been disposed at outside around the pipe 72, a cylindrical rotor assembly body 74 encircling the magnet 73, a shaft 75 having an end fixed at the rotor assembly body 74, an outer bearing 76 which is disposed at an end portion of the frame 71 and bears the outer protruding party of the shaft 75, and an inner bearing 77 which bears the fixed party of the rotor assembly body 74 of the shaft 75. And, the pipe 72 protrudes from the end surface of the magnet 73 and extends, while the inner bearing 77 is provided with a dent portion 77a having inner diameter as well as length fitting the outer diameter of the aforementioned extended protruding portion 72a, which are fixed to each other at this portion. This structure is said to make a motor with smaller outer diameter realizable without any interruption against the magnet 73 and the inner bearing 77.

However, from the view point of further proceeding with power-consumption lowering, such a method of attaching the inner bearing as in this example cannot always be designated as the best method. The reason is that within a limited length of the rotor assembly body, length of the magnet has been sacrificed to create the above-described fixed space. Reduction in the magnetic flux generated in a magnet directly results in reduction in the torque constants, that is an increase in the power consumed. In addition, in this configuration, the bearing is held at the cylindrical portion of the pipe head, but as the long pipe protruding from the magnet is too long compared with the small diameter, accuracy of the shape thereof can hardly be maintained. Accordingly, the construction that the inner bearing is attached depending on the outer diameter of the protruding portion of the pipe, and further the magnet is attached makes it difficult to maintain concentric nature of the inner bearing as well as the outer diameter of the magnet. Therefore, the air gap between the rotor assembly body and the magnet can not help being made wide. This is also another problem from the view point of further proceeding with power-consumption lowering.

SUMMARY OF THE INVENTION

For such a motor having a small diameter, the present invention aims to prevent an increase in loss along the axis when used with a large side pressure load, and further to solve the above-explained problems that the bearing attaching configuration in a small-diameter motor is difficult so that a loss is caused in the magnet region in the axial direction, and that the concentric nature of the rotor assembly body and the magnet cannot be maintained so that a loss is caused in the magnet region in the radial direction. In addition, such demands for improvement in environment-resistance, improvement in reliability, and improvement in productivity are also coped with. Thus, the object of the present invention is to provide a inventive slender-type cylindrical coreless motor capable of lowering power-consumption and coping with a demand for miniaturization and long-term driving of an equipment.

To attain the above-described object, the present invention has configured a motor comprising a pipe with its end portion being fixed to a frame, a cylindrical magnet having been disposed around the outer surface of the pipe, an outer bearing which is disposed at an end portion of the frame and bears the outer protruding portion of a shaft, and an inner bearing which bears the fixed portion of the rotor assembly body to the shaft, wherein the other end portion of the pipe has such a length that may not cause protrusion thereof from an end surface of the magnet, and the inner bearing is disposed at the end surface such that the inner diameter of the inner bearing is concentric with the outer diameter of the magnet. In addition, the portions of the inner bearing and the end surface of the magnet facing each other as well as the portions of the pipe and the end surface of the magnet facing each other are joined with solder material.

According to the invention according to claim 1 of the present invention, the other end portion of the pipe is designated to have such a length that may not cause any protrusion thereof from the end surface of the magnet, and the inner bearing is disposed at the end surface of the magnet such that the inner diameter of the inner bearing is concentric with the outer diameter of the magnet. This configuration makes it possible to minimize the length along the axis for fixing the inner bearing and to improve the concentric nature of the inner diameter of the rotor assembly body and the outer diameter of the magnet. Moreover, the pipe is no longer required to be in highly accurate shape.

The invention according to claim 2 of the present invention has attained such a configuration that the other end portion of the pipe is designated to have such a length that may not cause protrusion thereof from the end surface of the magnet, that the inner bearing is disposed at the end surface of the magnet such that the inner diameter of the inner bearing is concentric with the outer diameter of the magnet, and that the portions of the inner bearing and the end surface of the magnet facing each other are joined with solder material. Because of this, similar effects to those described above are achieved, and the joint strength of a joint portion in the inner bearing may be increased compared with a general bonding configuration.

The invention according to claim 3 of the present invention has been attained so that the inner bearing is configured by comprising the inner bearing metal housed in a case having a cup-like shape, the surface of which case is plated with Ni. This serves to improve solderability of the joint portion of the inner bearing and to reduce the number of joining processes.

The invention according to claim 4 of the present invention has attained a configuration wherein the case housing the inner bearing metal is formed of non-magnetic metal. This serves to prevent a loss of magnetic flux at the end portion of the magnet due to a short circuit.

The invention according to claim 5 of the present invention has attained a configuration wherein the portions of the pipe and the end surface of the magnet facing each other are joined with solder material. This serves to increase, in the joint portion of the pipe, hardness of the joint structure and to make it possible to reduce changes in dimensions of the motor structure body due to a lapse of time. Moreover, when the aforementioned inner bearing and the end portion of the magnet as well as the aforementioned pipe and the aforementioned end surface of the magnet are joined simultaneously, a process using no adhesive agents can be realized so that the thermal conductivity from the bearing through the frame can be increased. Moreover, effects such as reduction in the number of joining processes and the like can be obtained.

The invention according to claim 6 of the present invention has attained a configuration wherein the surface of the pipe is plated with Ni. This serves to improve solderability of the joint portion of the pipe and to reduce the number of joining processes.

The invention according to claim 7 of the present invention has been attained to configure a battery driving equipment using a slender-type cylindrical coreless motor which exerts the above-described effects. Thus, it is possible to reduce current consumption by the motor which takes a large part in the equipment, thereby reducing current consumption of the equipment itself.

DESCRIPTION OF THE EMBODIMENTS

Embodiments of the present invention will be explained as follows with reference to the drawings.

Figure 1:
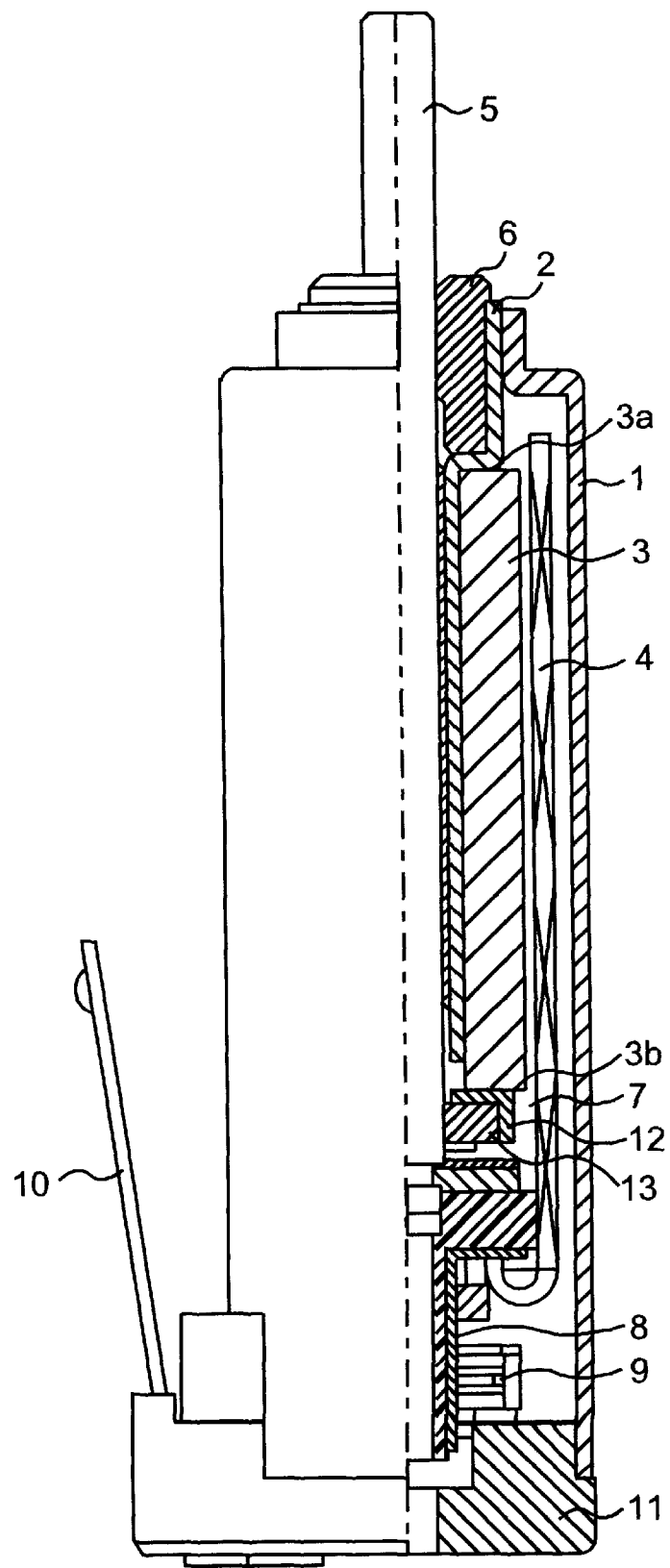
FIG. 1 is a structural view showing an embodiment of the motor according to the present invention.

FIG. 1 is a structural view showing an embodiment of the motor according to the present invention. This motor is configured by comprising a frame 1 in shape of a slender cylinder, a pipe 2 being inside the frame 1 with its end portion being fixed to the aforementioned frame, a cylindrical magnet 3 having been disposed at outside around the pipe 2, a rotor assembly body 4 having a cylindrical coil encircling the magnet 3, a shaft 5 having an end fixed at the rotor assembly body 4, an outer bearing 6 which is disposed at an end portion of the frame 1 and bears the outer protruding party of the shaft 5, an inner bearing 7 which bears the fixed party of the rotor assembly body of the shaft 5, a commutator 8 supplying electricity to the rotor assembly body 4, a brush 9, and a load dispatching terminal 10, and a bracket 11 holding these components. In addition, the inner bearing 7 is configured so that the inner bearing metal 13 may be housed in a cup-shaped case 12.

And, a magnetic circuit is configured by comprising the magnetized magnet 3 as well as the frame 1 encircling it. On the other hand, load dispatching is implemented from the dispatching terminal 10 through the brush 9 and the commutator 8 to the rotor assembly body 4, and, subject to flux linkage with the magnetic circuit, the magnetic field generates rotary drive force an d outputting is implemented to outside the motor by the shaft 5.

Since the present invention relates to the assembly method as well, the outline of the assembly procedure will be explained as follows. The rotor assembly body 4 is cup-shaped, comprising cylindrically-formed coil and a commutator 8. The shaft 5 is fixed concentrically with the axis piercing the rotary center. The stator unit is to be assembled first of all from around the bearing. The outer bearing 6 is fixed to the pipe 2 by press fitting, etc., into which the magnet 3 is inserted and the end surface 3a and the cylindrical surface facing each other is solder-fixed. The inner bearing 7 is fitted to the other end surface 3b of the magnet, and the surfaces facing each other are solder-fixed. Moreover, the other bearing 6 as well as the inner bearing 7 are impregnated with lubricating oil. After that, the part of the pipe 2 of this subassembly is fixed to the frame 1 by press fitting, etc.

On the other hand, as concerns the bracket unit, the brush 9 as well as the load dispatching terminal 10 are to be attached in advance to the bracket 11 made of insulating material. And, the rotor assembly body 4 is inserted into the thus built-up stator unit, and further the bracket unit is fitted and fixed thereto by press fitting, etc., and the motor is finished.

Figure 2:
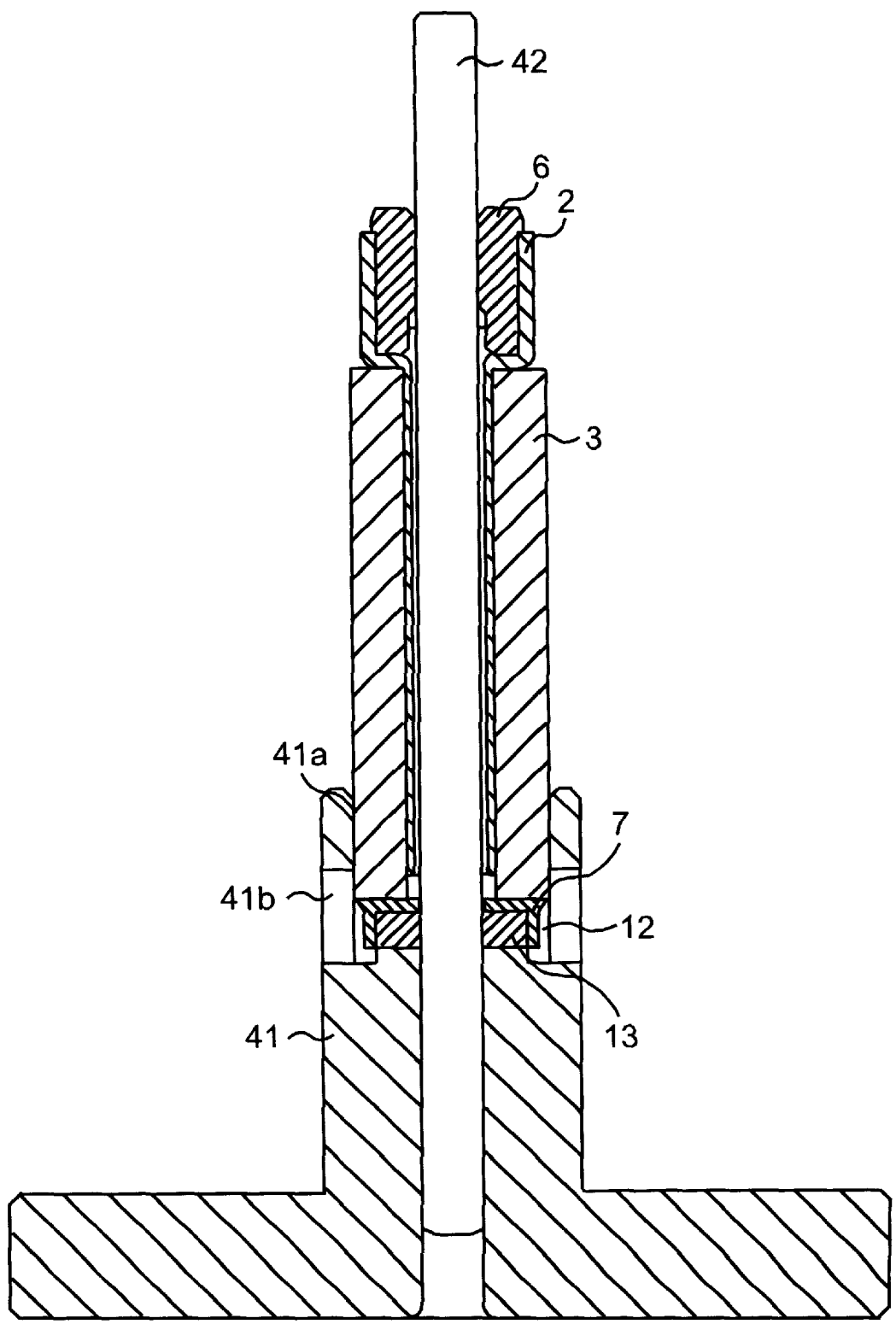
FIG. 2 is a longitudinal-section view showing a fixing method of an inner bearing of a motor of an embodiment according to the present invention.
Figure 3:
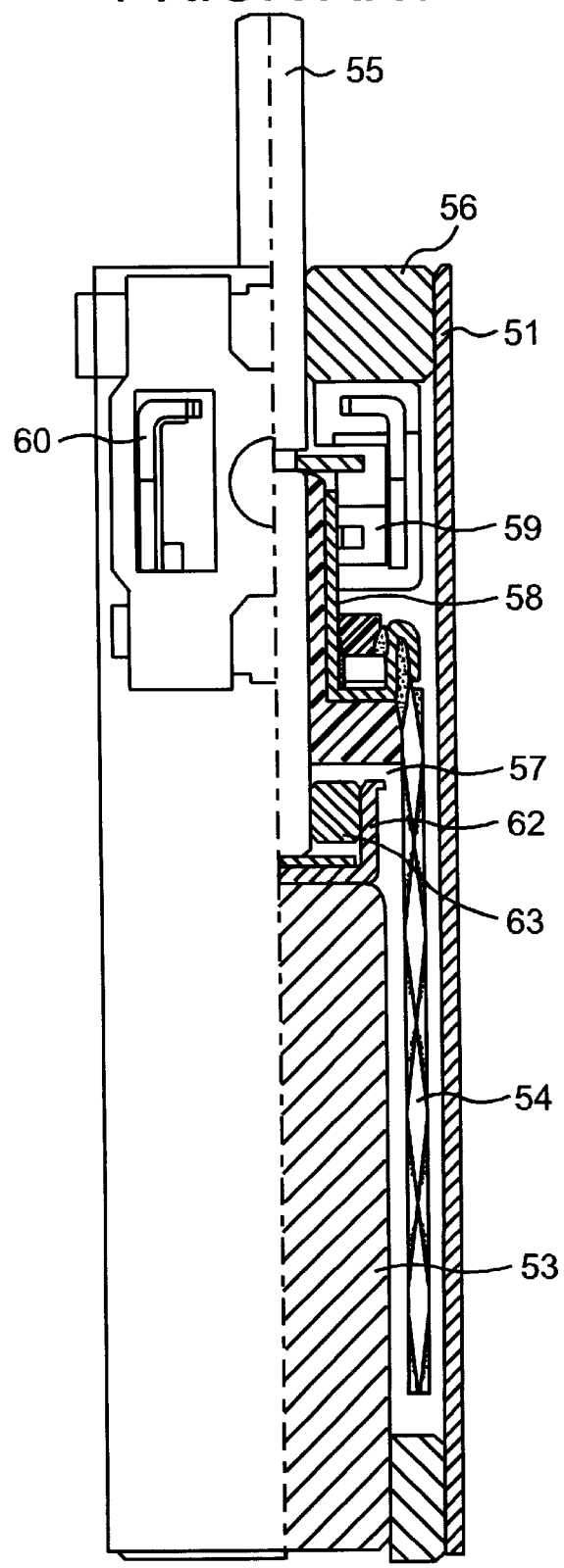
FIG. 3 is a structural view showing a motor of a conventional embodiment.

Now, the configuration on the magnet being the main part of the present invention and adjacent parts thereof will be explained. As described above, the inner bearing 7 is solder-fixed to the end surface of the magnet 3. This configuration features the magnet 3 tightly fitting the inner bearing 7, the outer surface of the magnet 3 being concenticly fixed to the inner surface of the inner bearing 7, and fixing being conducted by solder fixing. Assembly of this part is conducted as shown in for example FIG. 2. In FIG. 2, the guide part 41a of the centering improving device 41 guides the outer surface of the magnet 3. And, the pin 42 is disposed concentricly with the guide unit 41a to guide the inner surface of the inner bearing 7. The centering improving device 41 has an access hole 41b to the facing portion of the magnet 3 and the inner bearing 7, and the both parties can be fixed under the state that the improvement device is working as a concentric guide. Here, it is advisable that the solder material is supplied to the facing surfaces in advance. There are various heating methods, and the one involving infrared beam heating is most stable.

Thus the magnet 3 and the inner bearing 7 have been closely disposed and therefore, the inner bearing 7 can be held and fixed with the smallest length along the axis. Consequently, the length of the magnet 3 inside the rotor assembly body 4 is no longer subject to a loss, which in turn makes it possible to increase magnetic flux. Accordingly, the torque constant gets larger and the lowered consumption currency becomes realizable. Or otherwise the length of a motor can be shortened, making use of that advantage.

As the outer surface of the magnet 3 and the inner surface of the bearing 7 have been concentricly fixed, the concentric nature of the outer diameter of the magnet 3 and the inner diameter of the rotor assembly body 4 can be improved than in the conventional embodiments. Accordingly, that allowance makes it possible to design a smaller air gap (a gap between the both parties) and a magnet 3 with a larger diameter, and the consequent increase in magnetic flux can realize a lowered consumption current. Or that allowance can slenderize the diameter, or improvement in roominess can improve reliability against a shock. In addition, since the configuration does not depend on the pipe 2 as a standard for mounting the inner bearing 7, the pipe 2 can show a predetermined performance without requiring a high accuracy of shaping. Accordingly, normal press parts can be used, which can provide a motor at a low price.

Figure 4:
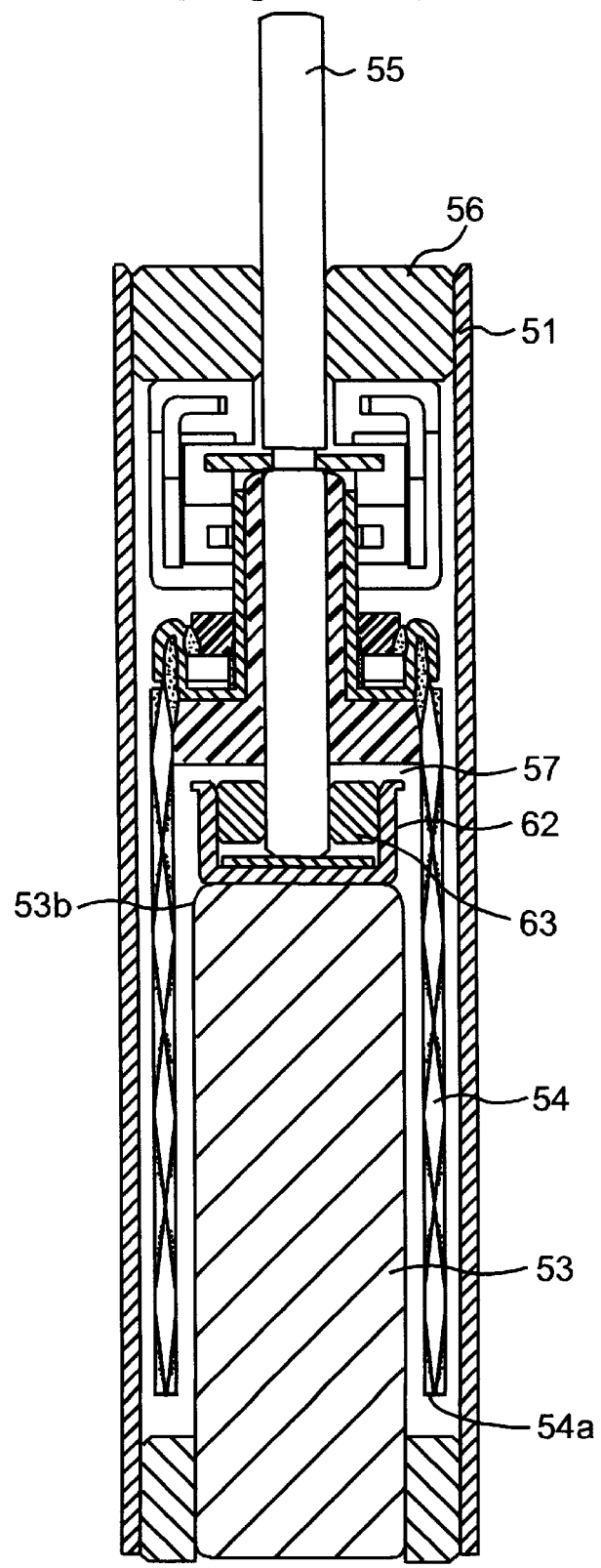
FIG. 4 is a structural view showing a status with a magnet having been inclined with a gradient in a conventional embodiment.
Figure 5:
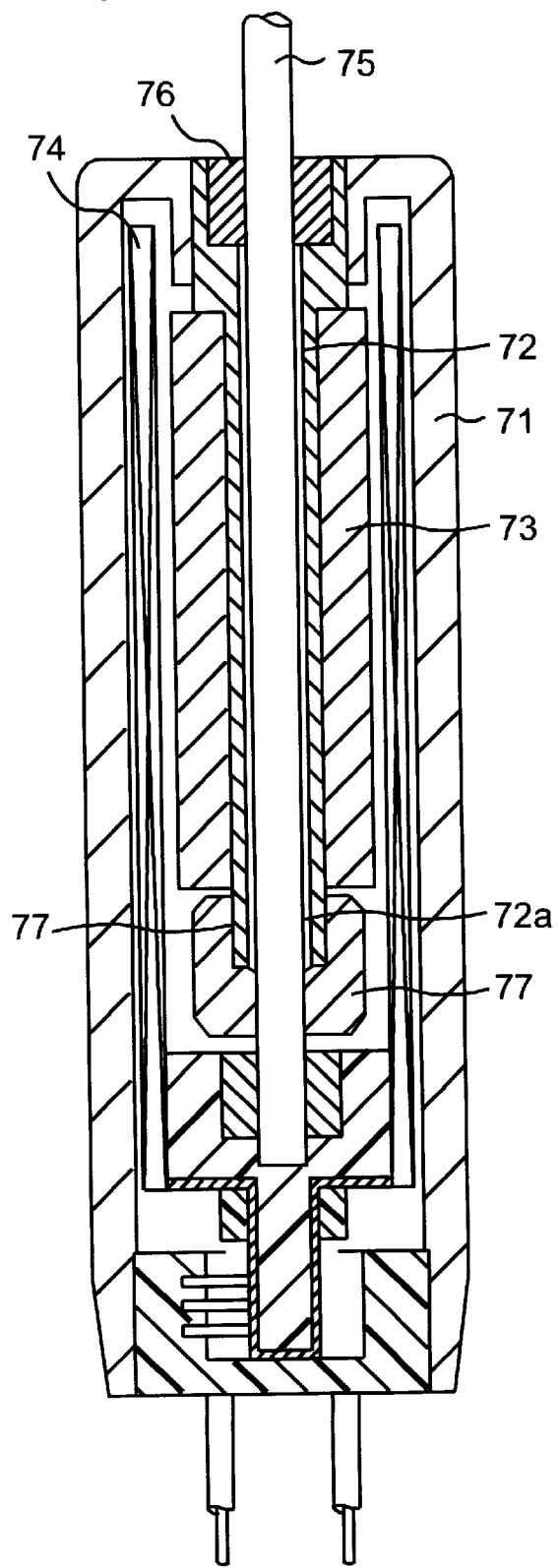
FIG. 5 is a structural view showing a motor of another conventional embodiment.

Incidentally, as concerns the arrangement that the outer surface of the magnet 3 and the inner surface of the bearing 7 are concentricly fixed, the difference against the invention in the aforementioned Japanese Patent Laid-Open No. 9-9554 specification will be explained as follows. A scene of the conventional embodiment has been drawn in FIG. 4. In the drawing, the magnet 53 is inclined with a gradient toward the frame 51, and the inner end surface 53b gets closer to the rotor assembly body 54. In such a case, when an inner bearing 57 is tried to be disposed concentricly with the outer diameter of the inner end surface portion 53b of the magnet, the head portion 54a of the rotor assembly body 54 is to be brought into direct contact with the magnet 53. That is, in this motor the inner bearing 57 should have been aligned independently regardless of the outer diameter of the magnet 53. The arrangement that the inner bearing is concentricly fixed to the outer surface of the magnet has become for the first time necessary and effective in the bearing disposition configuration of the present invention. Moreover, fixing is conducted by soldering, which can increase the joining strength compared with adhesive bonding. It depends greatly on selection, but at least not less than 20% can be improved. Accordingly, at a small faying surface area of the inner end surface 3b of the magnet, highly reliable joint is feasible and highly reliable small-diameter motor can be realized.

As shown in FIG. 1, the magnet 3 has been inserted into the pipe 2. And one end surface 3a and the inner cylindrical surface of the magnet 3 are facing against the pipe 2. Any of the facing surfaces are fixed by soldering. This of course can reduce the number of assembly process similar to in the case of joint part of the inner bearing, and moreover the following performance as well as effects are attained.

At first, as compared with adhesive bonding, hardness of the joint portion increases. Especially, hardness at the joint portion of the outer end surface 3a of the magnet 3 can be improved, which greatly contributes to an improvement in vibration resistance. This serves to support the inner bearing 7 with higher hardness with displacement in the rotor being reduced, to enable the air gap to be designed smaller, thus a small-diameter motor with low consumption currents to be realized. In addition, changes in dimensions of the motor configuration body due to a lapse of time are reduced compared with adhesive bonding. Magnetic attracting power is always acting between the magnet 3 and the frame 1, but in the case of solder material, creep is smaller compared with adhesive bonding. Accordingly, stability in dimensions is improved and changes in the air gap are reduced. Therefore, more highly reliable small-diameter motor will be attained. In addition, by joining all of the pipe 2, magnet 3, and the inner bearing 7 by solder materials, adhesives can be excluded from the process. The adhesive bonding process used to be the most difficult process for quality maintenance, requiring a lot of administrative points to be checked. There are no needs to worry about reaction between an adhesive material and impregnation oil for the bearing either. Therefore, selection freedom on impregnation oil for bearings as well as freedom on the process increases. Moreover, since any heat insulating materials are not interposed between the inner bearing 7 and frame 1, thermal conductivity increases, and the increase in temperature in the bearings at the time of high-speed rotation can be reduced and reliability can be increased. In addition, it is self-evident, but by joining them simultaneously, the number of joining process can be reduced and productivity can be increased. Incidentally, as shown in the drawing, the pipe is slender and long. Therefore, if accuracy in shaping is required, the costs to be incurred become expensive. In the case where accuracy in shaping of comparatively lower grade is allowed to avoid that, it is advisable that joint is conducted with concentric nature of the outer diameter of the magnet 3 toward the outer bearing 6 being maintained by use of an improving device according to the same idea as in the one having been shown in FIG. 2. For joining, it is advisable that the solder material is supplied to the facing surfaces in advance, and infrared beam heating is conducted.

Now the inner bearing will be explained in detail as follows. The inner bearing 7 is configured by comprising the inner bearing metal 13 having been housed in a rough-cup-shaped case 12, the surface of which case 12 has been plated with Ni. In addition, the surface of the pipe 2 is plated with Ni. A rare earth magnet is mostly used in a slender-type cylindrical motor, which in many cases is plated with Ni for the purpose of rust prevention. Therefore, soldering is feasible. Since any counter-material to be solder-joined thereto is fine as far as it is solderable, tinplate materials and solder-plating materials, etc. have been conventionally used. Although this is generally enough to proceed with soldering well, it has been found out that it is advisable that the case 12 as well as the pipe 2 are plated with Ni so as to further stabilize the quality to such an effect that there is no dispersion in the faying surface area, and the solder does not move around to reach the inner bearing metal 13 in the fixing process of the inner bearing 7, etc. When these have been attained, faying surface area as well as joint strength is stabilized over a wide range of heating temperature as well as heating period, and with smaller faying surface area than in a conventional embodiment the required strength can be secured, thus a highly reliable small-diameter motor can be realized.

In addition, the cup-shaped case 12 is formed with non-magnetic metal. The magnet 3 has been magnetized along the direction of diameter to generate a magnetic field. When a ferromagnetic substance touches its end surface, the magnetic flux at the end portion gets short-circuited. Accordingly, the case 12 being made of non-magnetic metal is to partly serve to prevent loss in magnetic flux to realize a low consumption current. On the other hand, the pipe 2 becomes more useful to increase magnetic flux with the pipe 2 being ferromagnetic. In the present invention, the pipe 2 and the case 12 are separate bodies, thus it becomes feasible that they are respectively made of different kinds of metal.

Incidentally, the frame 1 has been explained to be shaped cylindrical, but it does not necessarily have to be a real circle, and may have oval section view which is obtained by cutting the outer surface of the portion having low magnetic flux density. Even if the pipe 2 might slightly protrude from the end surface 3b of the magnet 3, it falls within the scope of the present invention if the inner bearing 7 is fixed to the end surface of the magnet 3 and not the pipe 2. The technology to fix the pipe 2 and the magnet 3 together by solder materials is to be applied to motors of not only bearing-type shown as an embodiment but also other various configurations, showing the above-explained performance as well as effects.

So far the embodiments of the present invention have been explained, but the present invention is not limited to the above-mentioned embodiments, and within the tenor of the present invention, various applications as well as developments are possible.

As apparent from the foregoing descriptions, according to the present invention, adoption of novel bearing attachment configuration inside a small diameter can expand magnet's region along the direction of axis, and secured concentric nature between the rotor assembly body and the magnet can expand magnet's region along the direction of diameter. And that serves to make it possible to provide a slender-type cylindrical coreless motor with excellent lowered power consumption and attain power-consumption lowering of battery driving equipment and in its return miniaturization as well as extension of working period. thereof.

What is claimed is:

1. A slender-type cylindrical coreless motor comprising:
   a frame in a shape of a slender cylinder;
   a pipe located inside said frame with one end portion thereof fixed to said frame;
   a cylindrical magnet located around an outer surface of said pipe;
   a rotor assembly body having a cylinder-like shape and encircling said magnet;
   a shaft having one end portion fixed to said rotor assembly body;
   an outer bearing located at an end of said frame and for holding an outer protruding portion of said shaft;
   an inner bearing for holding a fixed portion of said shaft against said rotor assembly body; and
   a second end portion of said pipe having a length that does not extend past an end surface of said magnet;
   said inner bearing located against an end surface of said magnet such that an inner diameter of said inner bearing is concentric with an outer diameter of said magnet.

2. The slender-type cylindrical coreless motor according to claim 1, wherein portions of said inner bearing (7) and said end surface (3b) of said magnet facing each other are joined with solder material.

3. The slender-type cylindrical coreless motor according to claim 2, wherein said inner bearing (7) comprises an inner bearing metal (13) housed in a case (12) having a cup-like shape, and the surface of said case is plated with Ni.

4. The slender-type cylindrical coreless motor according to claim 2, wherein said inner bearing (7) comprises an inner bearing metal (13) housed in a case having a cup-like shape, said case being formed of non-magnetic metal.

5. A slender-type cylindrical coreless motor according to claim 1, in a battery driven device.

6. A slender-type cylindrical coreless motor comprising:
   a frame in shape of a slender cylinder;
   a pipe located inside said frame with one end portion thereof fixed to said frame;
   a cylindrical magnet disposed around an outer surface of said pipe;
   a rotor assembly body having a cup-like shape and encircling said magnet;
   a shaft having one end portion fixed to said rotor assembly body; and
   an outer bearing and an inner bearing each for bearing said shaft;
   wherein portions of said pipe and an end surface of said magnet facing each other are joined with solder material.

7. The slender-type cylindrical coreless motor according to claim 6, wherein the surface of said pipe (2) is plated with Ni.

8. A slender-type cylindrical coreless motor according to claim 6, in a battery driven device.

* * * * *